J. B. RUDDY.
WEEDING DEVICE.
APPLICATION FILED SEPT. 3, 1913.
1,107,705.
Patented Aug. 18, 1914.
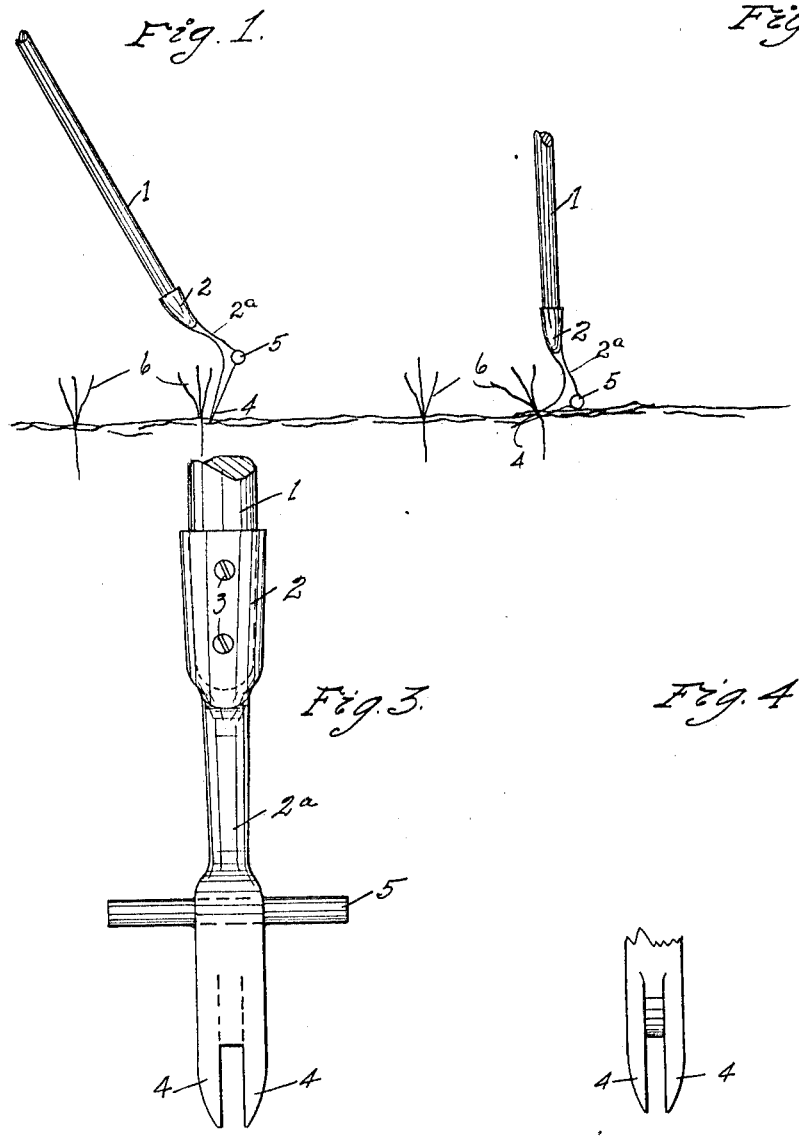

UNITED STATES PATENT OFFICE.

JAMES B. RUDDY, OF MEDINA, WASHINGTON.

WEEDING DEVICE.

1,107,705.

Specification of Letters Patent. Patented Aug. 18, 1914.

Application filed September 3, 1913. Serial No. 787,863.

*To all whom it may concern:*

Be it known that I, JAMES B. RUDDY, a citizen of the United States, and a resident of Medina, King county, Washington, have invented certain new and useful Improvements in Weeding Devices, of which the following is a full, true, and exact specification.

This invention relates to weeding devices, and has for its principal object to provide a device for quickly and conveniently removing weeds from the earth and more especially from lawns, where there is a considerable interweaving of grass roots surrounding the weed to be removed.

An important feature of the invention is that in the operation of removing the weed, very little bending of the body of the operator is required. The device is of exceedingly simple construction, strong and durable and effective for the purpose mentioned, as will be fully explained in the following specification, and shown in the accompanying drawings, in which—

Figure 1 is a side elevation of my device, showing the earth line, in its initial position with respect to the weed to be removed. Fig. 2 is a similar view, showing the device at about the completion of the operation of removing the weed. Fig. 3 is an enlarged detail fragmentary view of the device in front elevation. Fig. 4 is a similar view in rear elevation.

Referring now more particularly to the drawings reference numeral 1, designates the handle of my device, which may be of any suitable material and shape.

2 indicates a sleeve, which has the shank 2ª, all of which may be of usual construction, such as used in hoes, rakes and the like, and within the said sleeve is fastened, as by means of the screws 3, the lower end of the said handle. The shank 2ª terminates in the toes 4, and intermediate the said toes and the said sleeve is the cross bar 5 which is rigid with the said shank and preferably cast.

From the foregoing it is believed that the construction and operation of my device will be fully understood by others. It will be readily appreciated that more care is necessary in removing weeds from a lawn than is required in removing the same from the loose earth or a garden or the like, because in the last mentioned case, it matters little in what condition the earth may be left after the weed is removed so far as general appearance is concerned; whereas in the removal of weeds from lawns, the appearance of the earth surface after the weeds are removed, is of great importance. By reference to Fig. 1, it will be seen that the operator need stoop or bend but very little to properly position the device to remove the weed, indicated at 6, and when the device is in that position, the bar 5 forms a stop to limit the thrust of the toes into the earth, and, at the same time acts as a fulcrum about which the upper part of the handle is moved to its position as seen in Fig. 2. The upper part of the said handle moves in an arc of a circle, whose center is represented by the bar 5, and it is therefore obvious that very little bending of the body of the operator is required. The toes 4 straddle the root of the weed and when the device is in the position as shown in Fig. 2, all that is necessary is to lift the weed out of the earth. If the ground be rather hard, the foot may be pressed down upon the bar 5 to force the toes 4 into the earth, as will be understood.

While I have shown a particular form of embodiment in my invention, I am aware that minor changes will occur to others without departing from the spirit and scope of the invention, and I therefore desire to avoid being limited to the exact embodiment shown and described, except as limited by the appended claims.

What I claim as new and desire to protect by Letters Patent is,—

1. In an article of the class described, the combination with a handle and shank, of a pair of toes integral with the said shank and which are turned at an angle with respect thereto and a combined fulcrum and limit stop and foot receiving means upon the said shank and at the approximate apex of the angle formed by the said toes and the said shank.

2. In an article of the class described, the combination with a handle portion and a shank, of a pair of toes cast integrally with the said shank and at such an angle with respect to the said handle as to permit the upper end of the handle to be in the approximate horizontal plane of the operator's hands when the said toes are thrust vertically into the earth, and the cross bar upon the said shank and at about the junction of the said toes with the said shank.

JAMES B. RUDDY.

Witnesses:
 FRED P. GORIN,
 R. D. SMALLEY.